(12) United States Patent
Ritzer et al.

(10) Patent No.: US 6,751,916 B1
(45) Date of Patent: Jun. 22, 2004

(54) DECORATIVE STRUCTURE WITH SLOTTED GRID AND DETACHABLY SECURED TILES

(76) Inventors: Sandy A. Ritzer, 406 Union Hill Rd., Englishtown, NJ (US) 07726; Donald Ritzer, 13-4 Vermeer Dr., South Amboy, NJ (US) 08879

( * ) Notice: Subject to any disclaimer, the term of this patent is extended or adjusted under 35 U.S.C. 154(b) by 0 days.

(21) Appl. No.: 09/583,463

(22) Filed: May 31, 2000

Related U.S. Application Data

(63) Continuation-in-part of application No. 09/338,945, filed on Jun. 24, 1999, now abandoned.

(51) Int. Cl.[7] .................................................. E04F 13/08
(52) U.S. Cl. ..................... 52/385; 52/506.09; 52/483.1; 52/666
(58) Field of Search .......................... 52/385, 391, 384, 52/390, 506.09, 483.1, 136, 387, 392, 386, 474, 664, 666, 506.06, 506.08; 273/273, 272

(56) References Cited

U.S. PATENT DOCUMENTS

| | | | | |
|---|---|---|---|---|
| 2,877,877 A | * | 3/1959 | Davis, Jr. | |
| 3,017,724 A | * | 1/1962 | Frank | 52/390 |
| 3,731,445 A | * | 5/1973 | Hoffman et al. | 52/391 |
| 3,733,766 A | * | 5/1973 | Leclercq | 52/480 |
| 5,292,065 A | * | 3/1994 | Fiedrich | 237/69 |
| 5,447,004 A | * | 9/1995 | Vrnak | 52/387 |

* cited by examiner

Primary Examiner—Carl D. Friedman
Assistant Examiner—Naoko Slack
(74) Attorney, Agent, or Firm—Charles I. Brodsky

(57) ABSTRACT

The invention comprises an apertured frame secured to a substrate and having a slotted arrangement adapted to receive and secure properly shaped tiles.

7 Claims, 8 Drawing Sheets

DECORATIVE STRUCTURE WITH SLOTTED GRID AND DETACHABLY SECURED TILES

CROSS REFERENCE TO RELATED APPLICATION

This application is a continuation-in-part of application Ser. No. 09/338,945 filed Jun. 24, 1999 now abandoned.

BACKGROUND OF THE INVENTION

The present invention relates to decorative and functional structural members usable on a support surface such as a wall or floor or the like in residences, offices or such structures. In particular, the invention relates to structures made up of a frame which can be secured to the aforementioned support surface and to which tiles or panels of various types can be secured. The tiles or panels may take many forms and features as will be clear from the following description of the invention.

DESCRIPTION OF THE INVENTION

Figure 1:
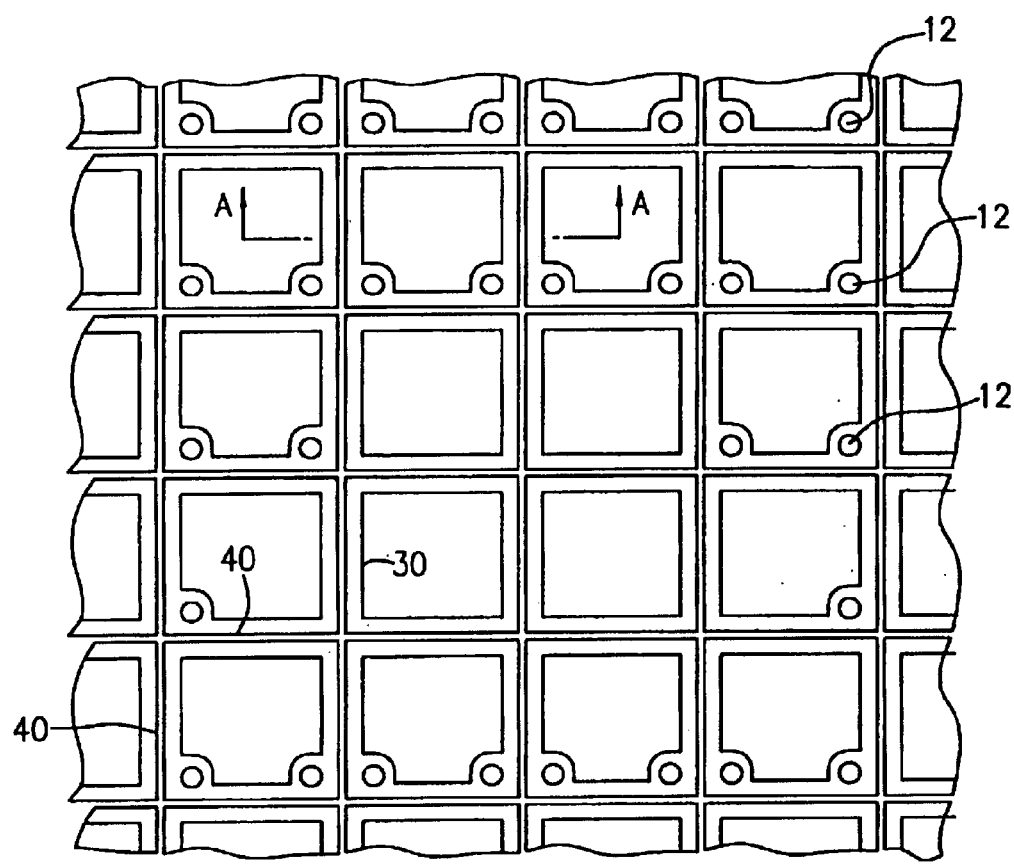
FIG. 1 is a plan view of a frame or grid used in practicing the invention.
Figure 2:
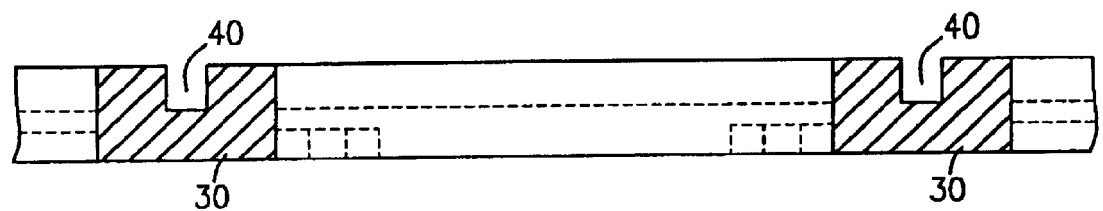
FIG. 2 is a sectional view along the lines 2—2 in FIG. 1.

Referring to the drawings, the present invention is shown and described with respect to a support surface 12 such as a floor or wall of any type, for example in a bathroom or in any other room in a house or other building. The many possible uses of the invention will be clear to those who read this description of the invention.

An assembly embodying the invention includes a frame or grid 10 which is of any desired size or shape and is adapted to be secured to the above-mentioned support surface by screws or the like inserted into holes 12. In one of the most appropriate uses of the invention, the frame 10 is secured to a wall.

The frame is preferably made of a light metal, wood or plastic of the like and includes vertical arms 20 and horizontal arms 30 both of which are provided with slots 40 along their lengths. The slots have a base 62 and side wall 64.

Figure 3:
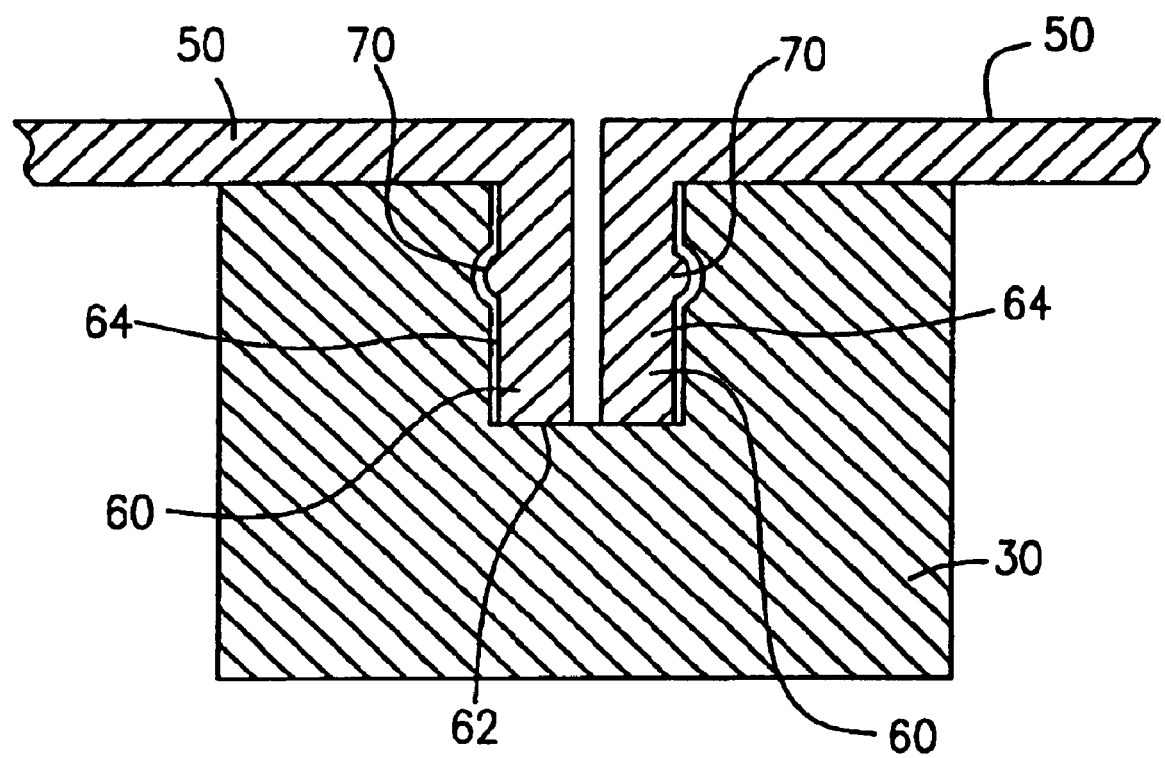
FIG. 3 is an enlarged sectional view of a portion of FIG. 1 showing a portion of a tile in place therein.

According to the invention, tiles 50 are provided overlying the openings in the grid which may be in the form of rectangles or the like formed by the horizontal and vertical arms of the grid. The tiles are secured to the frame or grid as follows. The tiles have bent-down horizontal and vertical edges which are adapted to fit into the slots formed as seen in FIG. 3.

In one form of the invention in order to secure the edges of the tiles in the slots, the bent down edges or arms are formed with slight protrusions 70 which are adapted to fit into and engage small depressions on the opposed walls of the slots. Other means for securing the tiles in place in the slots will occur to those skilled in the art.

It can be seen that the tiles 50 are readily and easily inserted in the slots in the frame and at the same time they can be readily removed with a knife or screw driver if for some reason it is desired to apply new tiles.

Figure 4:
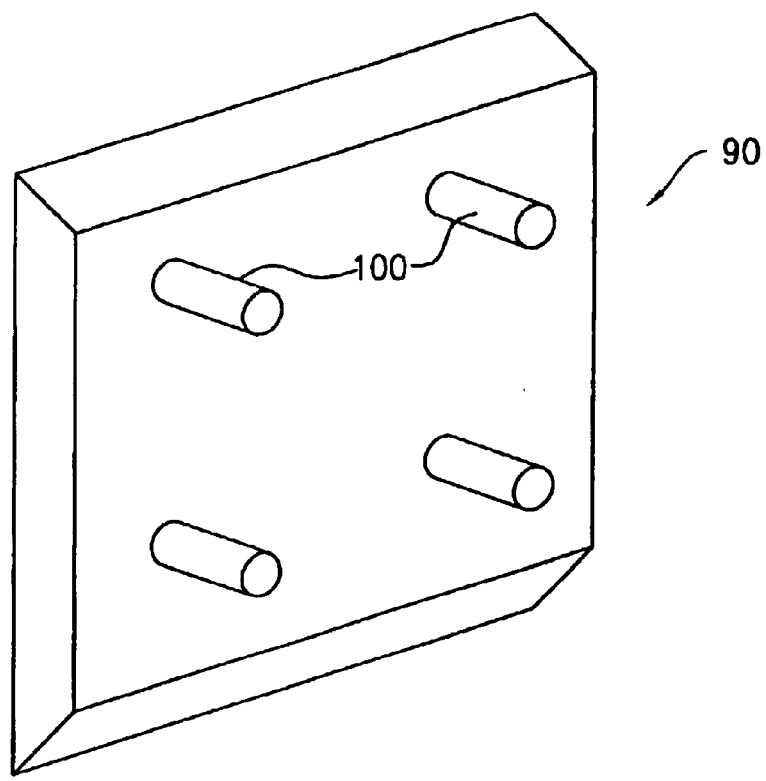
FIG. 4 is a sectional view of a modification of the invention.

FIG. 4 shows a modified tile of the invention 98 having a plurality of mounting pins which are intended to be inserted into holes 110 shown in tiles.

Figure 5:
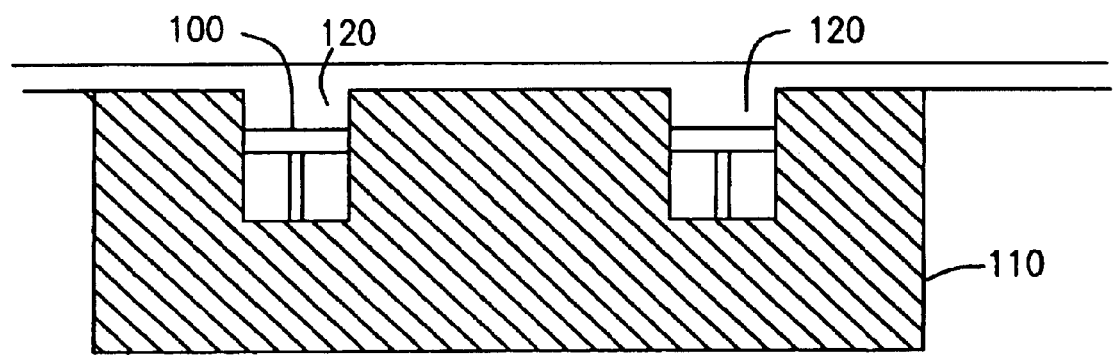
FIG. 5 is a perspective view of a modification of the invention.

FIG. 5 is a sectional view of a modified frame of the invention.

Figure 6:
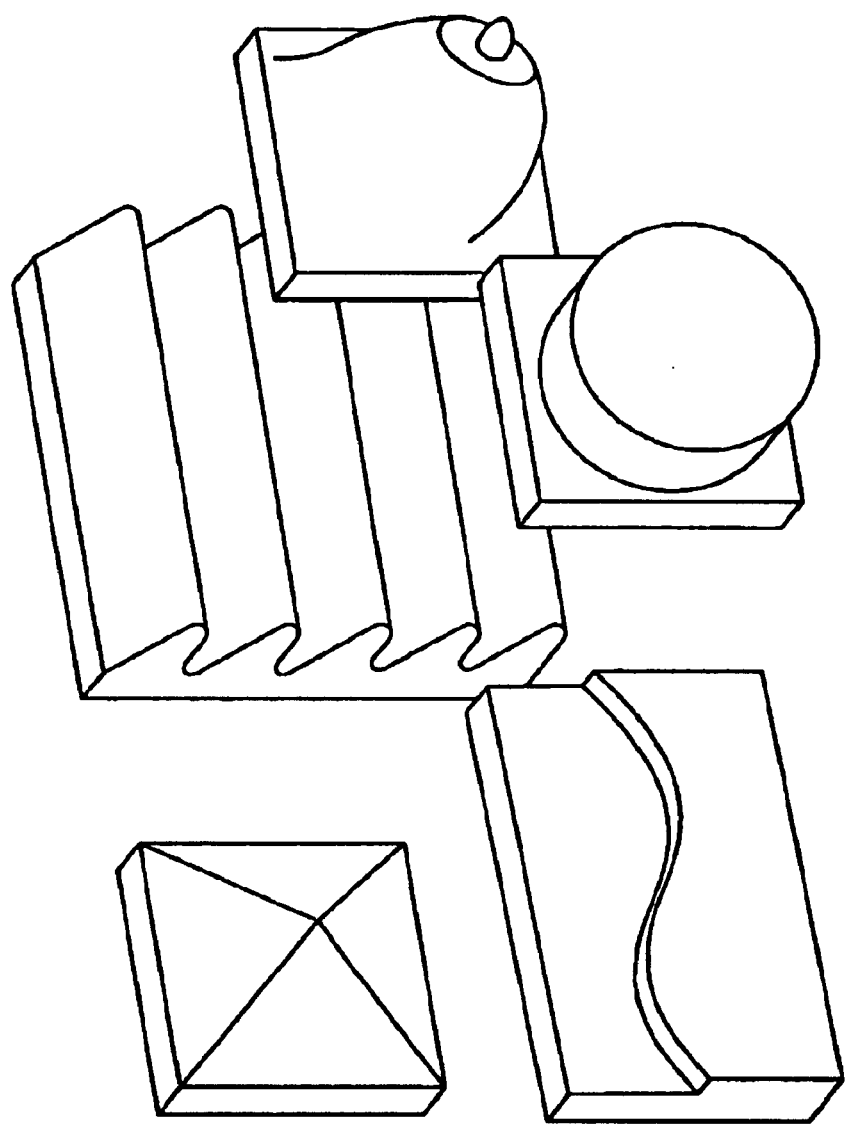
FIG. 6 is a perspective view showing the surface of various forms the surface of a tile may take.
Figure 7:
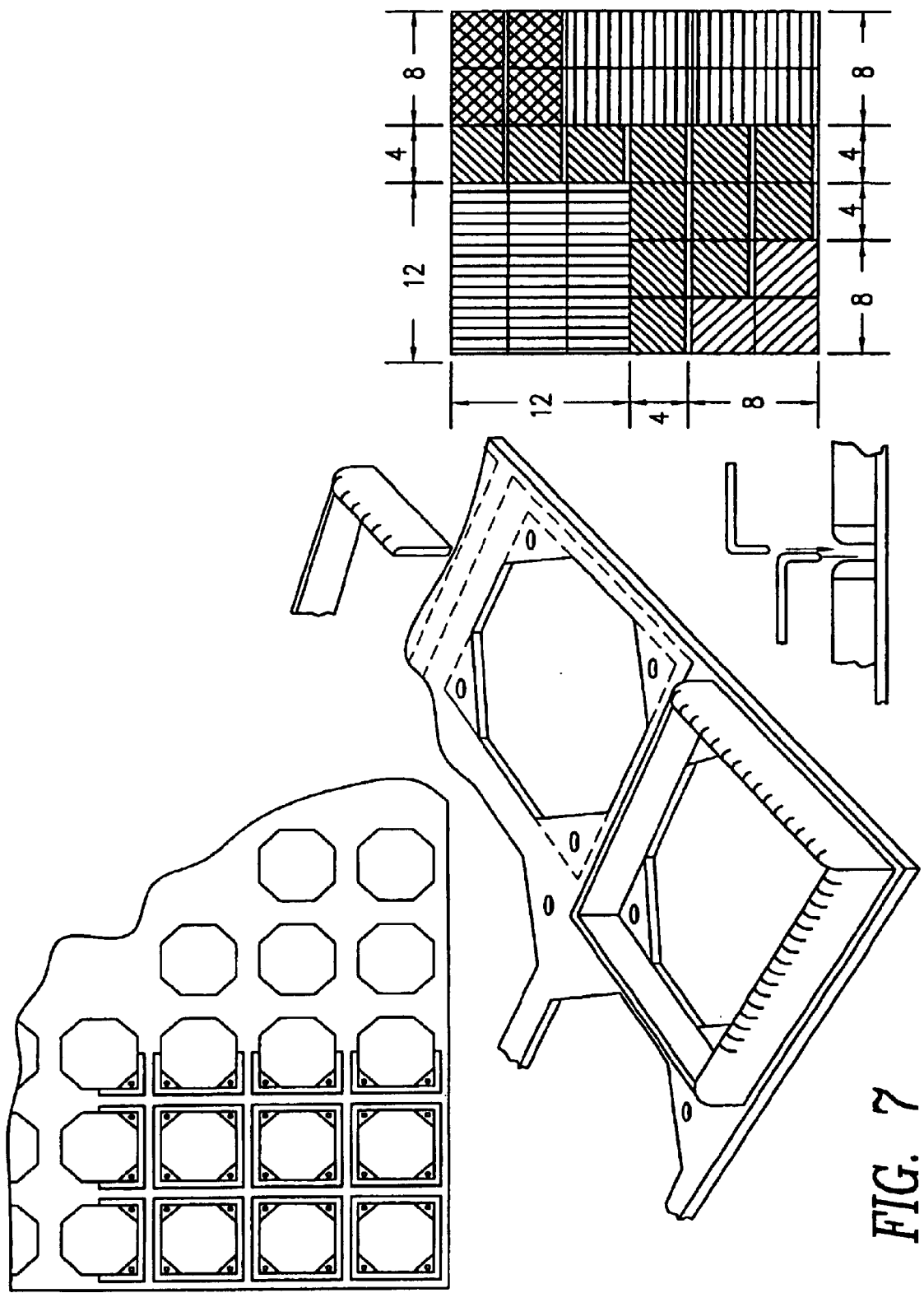
FIG. 7 is a plan view of a modification of the invention.
Figure 8:
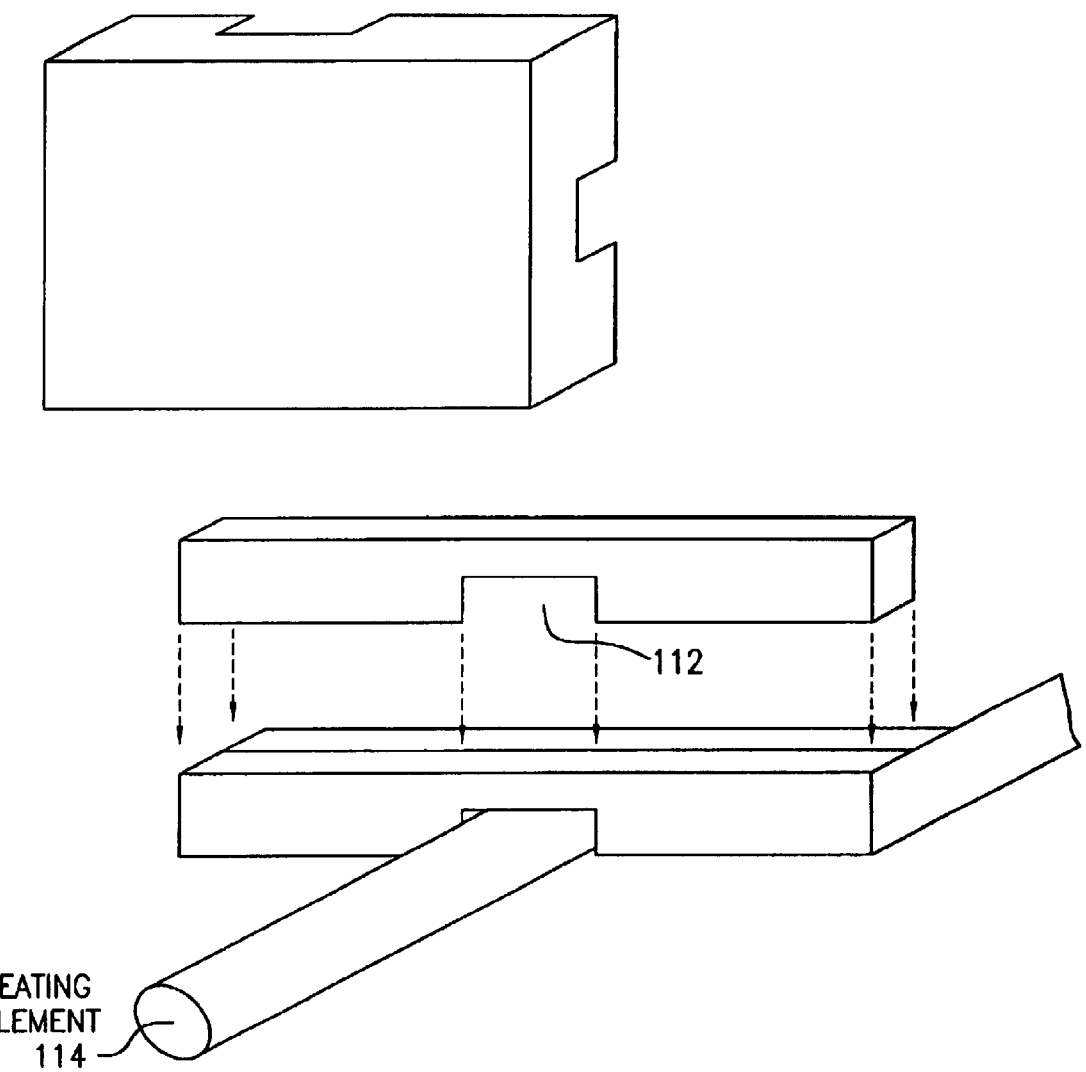
FIG. 8 is a perspective view of a modification of the invention which utilizes radiant heating.

FIG. 6 shows a plurality of tiles 110 with different surface configurations;

FIG. 7 shows a modification in the surface effect of various tiles;

FIG. 8 is a perspective view of a portion of a modification of the invention showing a portion of tile assembly 120 having a base portion which preferably seats on a floor and a heating tube 114 extends along the lower surface of the tile in a slot 112 therein.

Figure 9:
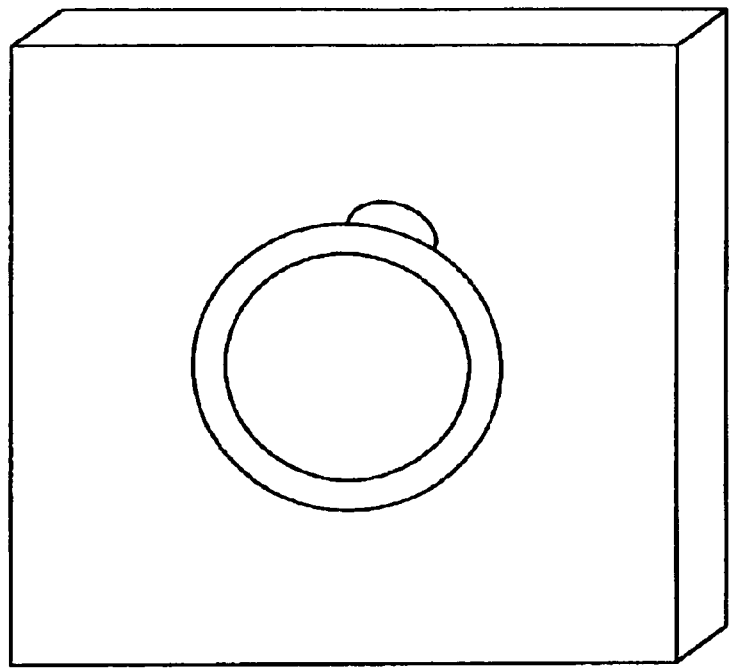
FIGS. 9–12 show modified panels using the invention.

FIG. 9 shows a tile having a towel ring secured to it.

Figure 10:
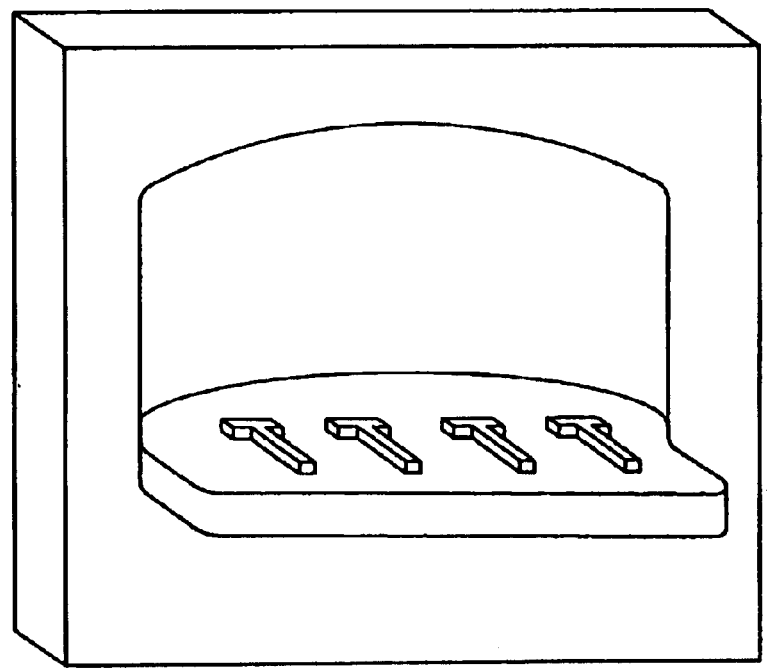

FIG. 10 shows a tile having a soap dish secured to it.

Figure 11:
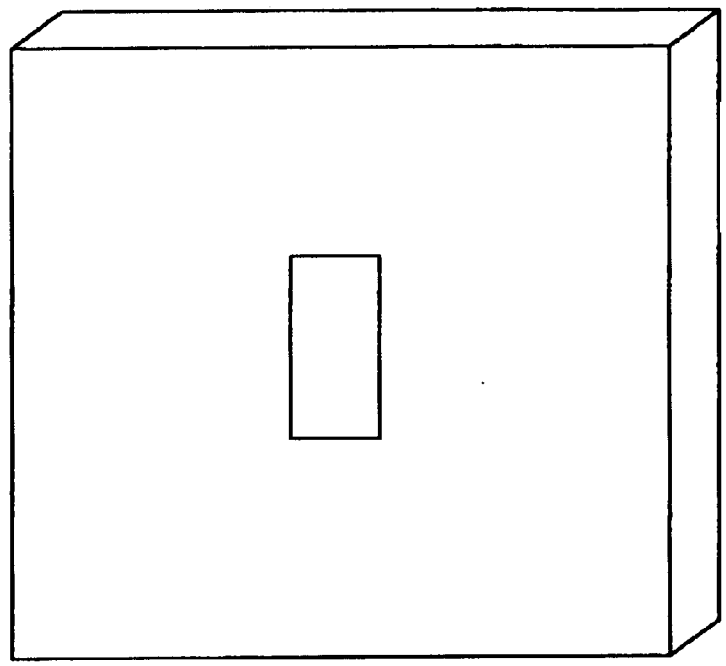

FIG. 11 shows a tile with an electrical switch integral therewith and with electrical wires (not shown) beneath the tile.

Figure 12:
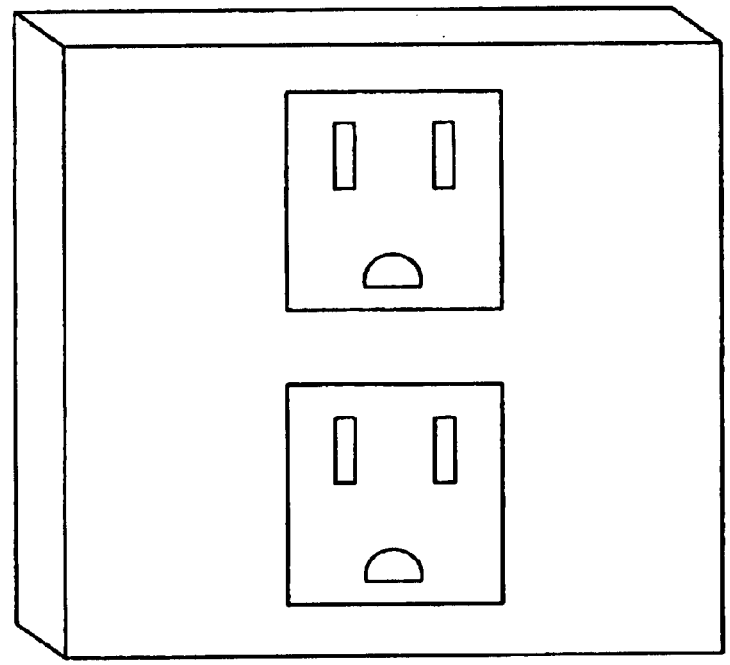

FIG. 12 shows a tile; carrying an electrical outlet with multiple connections.

What is claimed is:

1. A versatibly changeable decorative structure comprising:
    a plurality of members integrally arrayed in rows and columns forming a one-piece support grid, said members being individually slotted, and being spaced apart one from another horizontally between columns and vertically between rows;
    a plurality of decorative panels individually insertable within slots of members in parallel rows and in parallel columns in overlying interstices therebetween;
    first means integral with said panels for detachably securing each of said panels with said members in being supported by said grid in presenting a decorative appearance thereto, and in being removable from said grid when a change of appearance is desired;
    and second means securing said grid to a surface to be covered thereby;
    with individual ones of said panels being replaceable to change the look provided to said surface according to user preference without having to first remove said covering grid therefrom.

2. The versatibly changeable decorative structure of claim 1 wherein said plurality of decorative panels are individually insertable within slots of members in at least one of adjacent rows and of adjacent columns.

3. The versatibly changeable decorative structure of claim 1 wherein said plurality of decorative panels are individually insertable within slots of members in both of adjacent rows and of adjacent columns.

4. The versitably changeable decorative structure of claim 1 wherein said first means detachably secures each of said panels with said members by a pressure fit.

5. The versitably changeable decorative structure of claim 1 wherein said first means include edges on said panels bendable in a first direction to secure said panels with said members, and bendable in a second direction to release said panels from said members.

6. The versitably changeable decorative structure of claim 1 wherein said members are spaced apart one from another between parallel rows and parallel columns in equal amounts both horizontally and vertically.

7. The versitably changeable decorative structure of claim 6 wherein said panels comprise ceramic tile.

* * * * *